(12) United States Patent
Goto (10) Patent No.: US 12,502,148 B2
(45) Date of Patent: Dec. 23, 2025

(54) MEDICAL INFORMATION PROCESSING APPARATUS, MEDICAL INFORMATION PROCESSING METHOD, AND PHOTON COUNTING CT APPARATUS

(71) Applicant: CANON MEDICAL SYSTEMS CORPORATION, Otawara (JP)

(72) Inventor: Takahiro Goto, Utsunomiya (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 209 days.

(21) Appl. No.: 18/447,394

(22) Filed: Aug. 10, 2023

(65) Prior Publication Data

US 2024/0057949 A1 Feb. 22, 2024

(30) Foreign Application Priority Data

Aug. 22, 2022 (JP) .................................. 2022-131638

(51) Int. Cl.
*A61B 6/03* (2006.01)
*A61B 6/00* (2024.01)
*A61B 6/42* (2024.01)

(52) U.S. Cl.
CPC ............ *A61B 6/032* (2013.01); *A61B 6/4241* (2013.01); *A61B 6/481* (2013.01)

(58) Field of Classification Search
CPC ..... A61B 6/5205; A61B 6/032; A61B 6/4241; A61B 6/482; A61B 6/481; A61B 6/504; A61B 6/5217; A61B 6/5229; A61B 6/4007; A61B 6/4064; A61B 6/486; A61B 6/463; A61B 6/5294; A61B 6/52; A61B 6/4441; A61B 6/464; A61B 6/465; A61B 8/463; A61B 8/464; A61B 8/465; A61B 5/055; A61B 6/4035; A61B 6/507; A61B 5/0073; A61B 5/7207; A61B 6/03; A61B 6/54; A61B 2576/00; A61B 6/466; A61B 8/483; A61B 8/5215; A61B 1/00009; A61B 6/502; A61B 6/5235; A61B 6/503; A61B 5/026; A61B 8/4416; A61B 5/7267; A61B 5/02007; A61B 8/5223; A61B 6/469; A61B 8/0891; A61B 5/743; A61B 8/06; A61B 8/065; A61B 34/10; A61B 90/37;

(Continued)

(56) References Cited

U.S. PATENT DOCUMENTS

2004/0101086 A1* 5/2004 Sabol .................. A61B 6/4241
378/4
2004/0101089 A1* 5/2004 Karau .................. A61B 6/481
378/4

(Continued)

FOREIGN PATENT DOCUMENTS

JP 2014-117568 A 6/2014

*Primary Examiner* — Irakli Kiknadze
(74) *Attorney, Agent, or Firm* — Oblon, McClelland, Maier & Neustadt, L.L.P.

(57) ABSTRACT

A medical information processing apparatus of an embodiment includes processing circuitry. The processing circuitry acquires a CT image obtained by a photon counting CT apparatus, generates a color image corresponding to the acquired CT image, generates a grayscale image corresponding to the color image on the basis of the acquired CT image or the generated color image, and provide both the generated color image and the generated grayscale image.

6 Claims, 7 Drawing Sheets

(58) Field of Classification Search
CPC ......... A61B 34/20; A61B 34/30; A61B 34/32;
A61B 90/92; A61B 90/96; A61B
5/02042; A61B 6/5211; A61B 2576/026;
A61B 6/548; A61B 6/4417; A61B 6/488;
A61B 6/5241; A61B 6/545; G16H 50/30;
G16H 30/20; G16H 30/40; G16H 50/20;
G16H 10/60; G16H 50/50; G16H 50/70;
G16H 20/40; G16H 40/63; G16H 15/00;
G06T 2207/10076; G06T 2207/30104;
G06T 5/50; G06T 7/0012; G06T 2200/24;
G06T 2207/10081; G06T 2207/10088;
G06T 2207/10132; G06T 2207/20092;
G06T 2207/30004; G06T 2207/30168;
G06T 11/206; G06T 7/11; G06T 1/20;
G06T 2207/20081; G06T 2207/20084;
G06T 2200/04; G06T 7/70; G06T 17/20;
G06T 17/00; G06T 7/20; G06T 7/285;
G06T 7/246; G06T 7/521; G06T 7/73;
G06T 7/85; G06T 5/70; G06T
2207/30016; G06T 2207/10024; G06T
15/08; G06T 15/205; G06T 2210/41;
H05G 1/265; G01R 33/543; G01R
33/5608; G06K 9/209; G06K 9/3233;
G06V 10/147; G06V 10/764; G06V
10/82; G06V 2201/031; G06V 2201/03;
G06V 2201/10; G06F 19/321; G06F
18/2413; G06F 18/22; G06F 18/217;
H04N 1/32128; H04N 1/32122; H04N
2201/3273; H04N 2201/3252; H04N
23/56; H04N 5/2226; G06N 3/044; G06N
3/08; G06N 20/00; G06N 3/047; G06N
3/045; G06N 3/02; H01J 35/00; H01J
2235/062; H01J 2235/068
USPC .................................................. 378/4, 19, 62
See application file for complete search history.

(56) References Cited

U.S. PATENT DOCUMENTS

| | | | |
|---|---|---|---|
| 2014/0232719 A1* | 8/2014 | Wahrenberg | G06T 15/08 345/424 |
| 2016/0148375 A1* | 5/2016 | Oh | G06T 11/008 382/131 |
| 2020/0082525 A1* | 3/2020 | Xu | A61B 5/02042 |
| 2020/0090384 A1* | 3/2020 | Atria | G06T 11/006 |
| 2020/0219237 A1* | 7/2020 | Ramsay | G06T 5/94 |
| 2021/0015438 A1* | 1/2021 | Sahbaee Bagherzadeh | G06N 3/045 |
| 2021/0082566 A1* | 3/2021 | Do | G06T 7/0012 |
| 2022/0265362 A1* | 8/2022 | Marti | G06T 7/85 |
| 2022/0318956 A1* | 10/2022 | Xu | G06T 5/50 |
| 2023/0064456 A1* | 3/2023 | Zhang | A61B 6/54 |
| 2023/0086070 A1* | 3/2023 | Liu | G06T 11/00 382/131 |

* cited by examiner

| PIXEL VALUE | COLOR |
|---|---|
| XX~XX | RED |
| XX~XX | BLUE |
| XX~XX | YELLOW |
| XX~XX | GREEN |
| ... | ... |

| PIXEL VALUE | GRAYSCALE |
|---|---|
| XX~XX | 0 |
| XX~XX | 50 |
| XX~XX | 100 |
| XX~XX | 150 |
| ... | ... |

| COLOR | GRAYSCALE |
|---|---|
| RED | 0 |
| BLUE | 50 |
| YELLOW | 100 |
| GREEN | 150 |
| ... | ... |

MEDICAL INFORMATION PROCESSING APPARATUS, MEDICAL INFORMATION PROCESSING METHOD, AND PHOTON COUNTING CT APPARATUS

CROSS-REFERENCE TO RELATED APPLICATION

The present application claims priority based on Japanese Patent Application No. 2022-131638 filed Aug. 22, 2022, the content of which is incorporated herein by reference.

FIELD

Embodiments disclosed in this specification and drawings relate to a medical information processing apparatus, a medical information processing method and a photon counting CT apparatus.

BACKGROUND

A photon counting computed tomography (CT) apparatus is an imaging diagnostic apparatus capable of discriminating an inspection target material through which X-rays have passed using a direct detector such as a semiconductor detector with high energy resolution. In an X-ray CT apparatus using a conventional indirect detector, a CT image is displayed in a grayscale called CT values in which bones are white, air is black, and water is gray, for example, on the basis of attenuation (absorption amount) of X-rays that have passed through a subject. Meanwhile, in the photon counting CT apparatus, energy information can be acquired by discriminating the energy of X-ray photons detected by the detector, and thus a display method of displaying a CT image through a color map using the energy information becomes possible.

There are cases in which grayscale CT images are required in addition to CT images generated using a color map, such as a case where color display is not possible due to the limitation on display devices, a case where a CT image is presented to a person who cannot perceive colors, and a case where doctors want to check grayscale CT images during medical examination. However, since a CT image generated using a color map does not have information for grayscale display such as CT values, it is not easy to generate grayscale CT images.

DETAILED DESCRIPTION

A medical information processing apparatus, a medical information processing method, and a photon counting CT apparatus according to embodiments will be described below with reference to the drawings. The medical information processing apparatus of the embodiments enables display of CT images in both a grayscale and a color map on the basis of CT images obtained by a photon counting CT apparatus.

The medical information processing apparatus of the embodiments includes processing circuitry. The processing circuitry acquires a CT image obtained by a photon counting CT apparatus, generates a color image corresponding to the obtained CT image, generates a grayscale image corresponding to the color image on the basis of the obtained CT image or the generated color image, and provides both the generated color image and the generated grayscale image.

First Embodiment

[Configuration of Medical Information Processing Apparatus 1]

Figure 1:
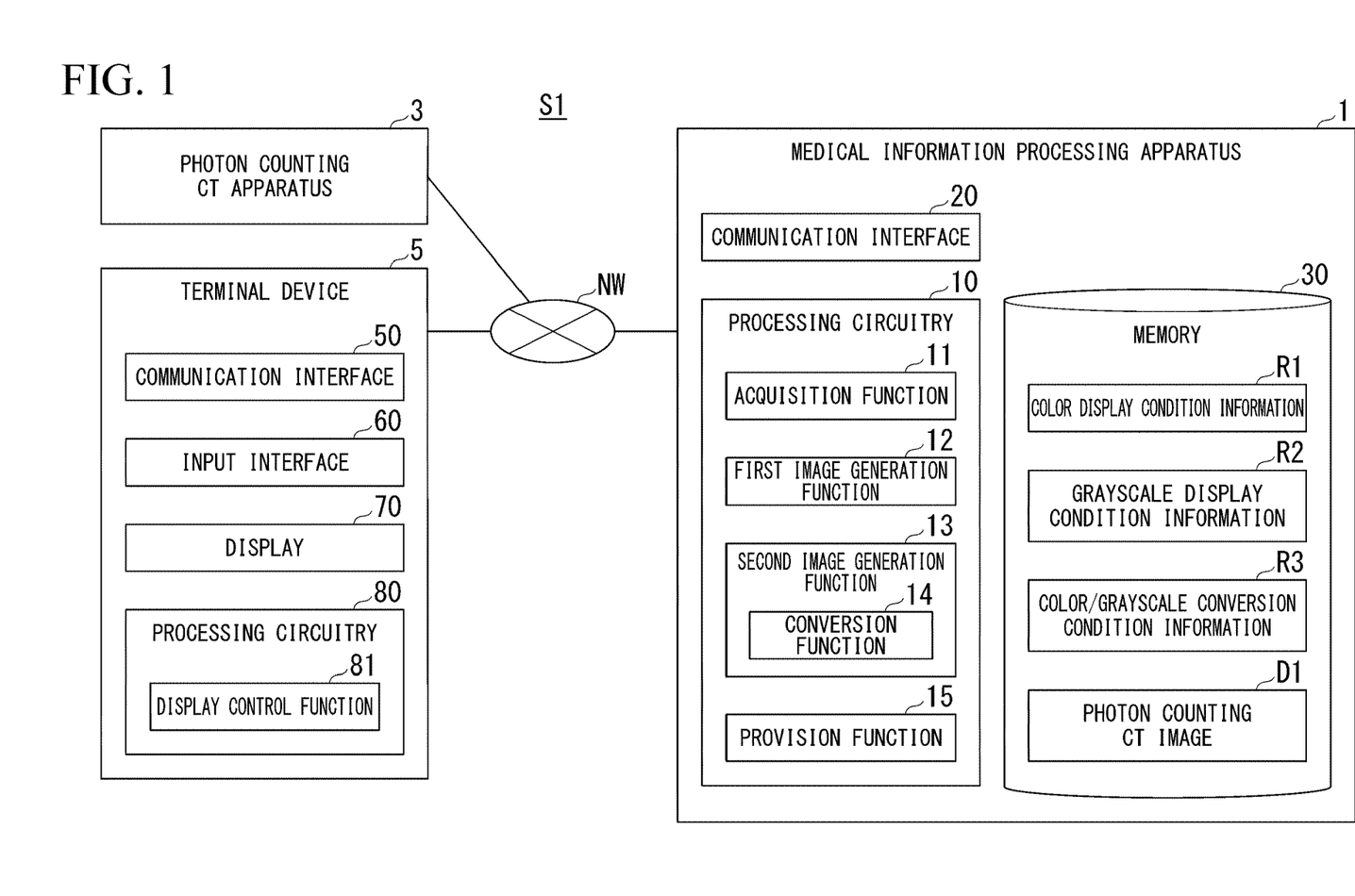
FIG. 1 is a diagram showing an example of a usage environment and functional blocks of a medical information processing apparatus 1 according to a first embodiment.

FIG. 1 is a diagram showing an example of a usage environment and functional blocks of a medical information processing apparatus 1 according to a first embodiment. The medical information processing apparatus 1 is installed, for example, in a medical institution such as a hospital. The medical information processing apparatus 1 may be, for example, a workstation, a server, or the like. The medical information processing apparatus 1 is connected to, for example, at least one photon counting CT apparatus 3, at least one terminal apparatus 5, and the like via a communication network NW such that data can be transmitted and received therebetween. In addition, the medical information processing apparatus 1 may be connected to a medical image database (not shown) that stores images obtained by the photon counting CT apparatus 3 such that data can be transmitted and received therebetween. The communication network NW indicates general information communication networks using telecommunication technology. The communication network NW includes a wireless/wired local area network (LAN) such as a hospital backbone LAN, an Internet network, a telephone communication network, an optical fiber communication network, a cable communication network, a satellite communication network, and the like.

The medical information processing apparatus 1 includes, for example, processing circuitry 10, a communication interface 20, and a memory 30. The communication interface 20 communicates with external devices such as the photon counting CT device 3 and the terminal device 5 via the communication network NW. The communication interface 20 includes, for example, a communication interface such as a network interface card (NIC).

The processing circuitry 10 includes, for example, an acquisition function 11, a first image generation function 12, a second image generation function 13, and a provision function 15. The second image generation function 13 includes, for example, a conversion function 14. The processing circuitry 10 realizes these functions by, for example, a hardware processor (computer) executing a program stored in the memory 30 (storage circuit).

A hardware processor refers to, for example, circuitry such as a central processing unit (CPU), a graphics processing unit (GPU), an application specific integrated circuit (ASIC), and a programmable logic device (for example, a simple programmable logic device (SPLD), a complex programmable logic device (CPLD), or a field programmable gate array (FPGA)). Instead of storing the program in memory 30, the program may be configured to be incorporated directly into the circuit of the hardware processor. In this case, the hardware processor realizes functions by reading and executing the program incorporated in the circuit.

The aforementioned program may be stored in the memory 30 in advance or may be stored in a non-transitory storage medium such as a DVD or a CD-ROM and installed in the memory 30 from the non-transitory storage medium when the non-transitory storage medium is set in a drive device (not shown) of the medical information processing apparatus 1. The hardware processor is not limited to being configured as a single circuit, and may be configured as one hardware processor by combining a plurality of independent circuits to realize each function. Further, a plurality of components may be integrated into one hardware processor to realize each function.

The acquisition function 11 acquires a photon counting CT image D1 obtained by the photon-counting CT device 3 from the photon counting CT device 3, a medical image database, or the like via the communication network NW and stores the photon counting CT image D1 in the memory 30. The photon counting CT image D1 is an aggregate of a plurality of energy (band) images, and each pixel position has a "pixel value" corresponding to a plurality of energies.

Further, the acquisition function 11 acquires an acquisition request for a photon counting CT image from the terminal device 5 via the communication network NW. This acquisition request includes designation of a grayscale and/or color map image. The acquisition function 11 is an example of an "acquirer" in the scope of the claims. That is, the acquisition function 11 acquires a CT image obtained by the photon counting CT apparatus.

The first image generation function 12 generates a photon counting CT image represented by a color map (hereinafter also referred to as a "color image") on the basis of the photon counting CT image D1 and color display condition information R1 which will be described later. The first image generation function 12 is an example of a "first image generator" in the scope of the claims. That is, the first image generation function 12 generates a color image corresponding to the acquired CT image. Details of processing of the first image generation function 12 will be described later.

The second image generation function 13 generates a photon counting CT image (hereinafter also referred to as a "grayscale image") represented in grayscale corresponding to the color image on the basis of the photon counting CT image D1 or the color image generated by the first image generation function 12. The second image generation function 13 generates the grayscale image on the basis of the photon counting CT image D1 and grayscale display condition information R2 which will be described later. Further, the conversion function 14 of the second image generation function 13 converts a color image into a grayscale image on the basis of color/grayscale conversion condition information R3 which will be described later. The second image generation function 13 is an example of a "second image generator" in the scope of the claims. That is, on the basis of the acquired CT image or the generated color image, the second image generation function 13 generates a grayscale image corresponding to the color image. The conversion function 14 is an example of a "converter" in the scope of the claims. That is, the conversion function 14 converts the generated color image into a grayscale image on the basis of the color/grayscale conversion condition information R3 (conversion condition information) in which color information of a color image and grayscale information are associated to generate the grayscale image. Details of processing of the second image generation function 13 and the conversion function 14 will be described later.

The provision function 15 provides (transmits) the various images generated by the first image generation function 12, the second image generation function 13, and the conversion function 14 to the terminal device 5 via the communication network NW in response to the acquisition request from the terminal device 5. The provision function 15 is an example of a "provider" in the scope of the claims. That is, the provision function 15 provides both the generated color image and the generated grayscale image.

The memory 30 is realized by, for example, a semiconductor memory element such as a random access memory (RAM) or a flash memory, a hard disk, or an optical disc. These non-transitory storage media may be realized by other storage devices such as a network attached storage (NAS) and an external storage server device connected via the communication network NW. The memory 30 may also include non-transitory storage media such as a read only memory (ROM) and a register. The memory 30 stores, for example, the color display condition information R1, the grayscale display condition information R2, the color/grayscale conversion condition information R3, the photon counting CT image D1, and the like. In addition, the memory 30 stores programs used by the processing circuitry 10, parameter data, and other types of data.

Figure 2:
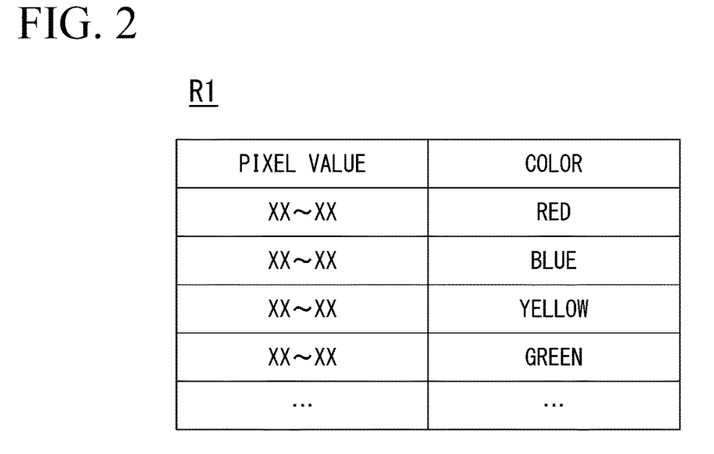
FIG. 2 is a diagram showing an example of color display condition information R1 according to the first embodiment.

FIG. 2 is a diagram showing an example of the color display condition information R1 according to the first embodiment. As shown in FIG. 2, in the color display condition information R1, pixel values (ranges of pixel values) of a photon counting CT image are associated with color information (color) in a case where the photon counting CT image is represented by a color map. The color information may be represented by RGB. The color display condition information R1 may include grayscale information.

Figure 3:
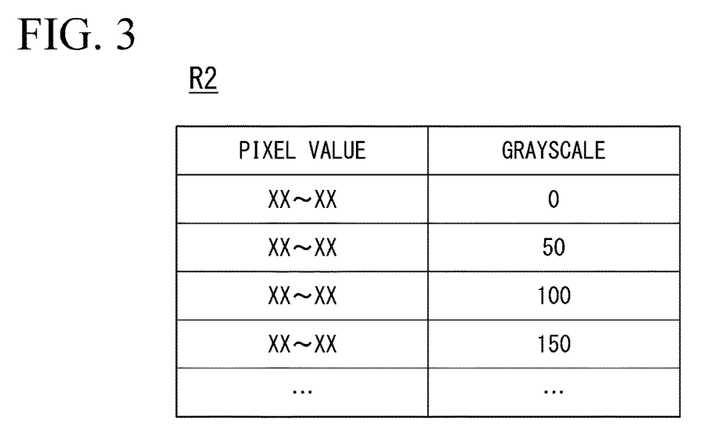
FIG. 3 is a diagram showing an example of grayscale display condition information R2 according to the first embodiment.

FIG. 3 is a diagram showing an example of the grayscale display condition information R2 according to the first embodiment. As shown in FIG. 3, in the grayscale display condition information R2, grayscale information is associated with pixel values (ranges of pixel values) of a photon counting CT image.

Figure 4:
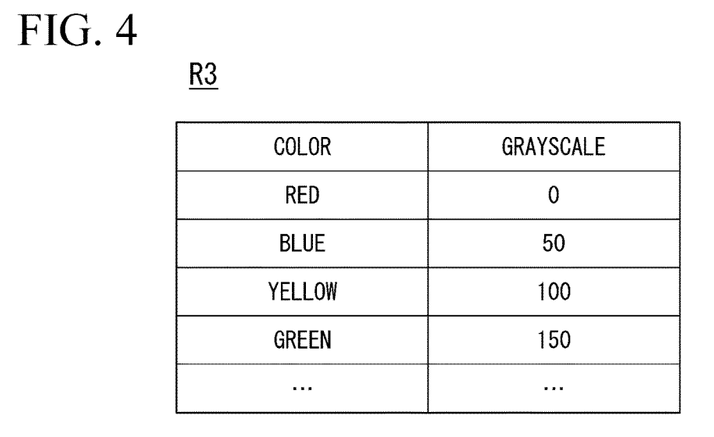
FIG. 4 is a diagram showing an example of color/grayscale conversion condition information R3 according to the first embodiment.

FIG. 4 is a diagram showing an example of the color/grayscale conversion condition information R3 according to the first embodiment. As shown in FIG. 4, in the color/grayscale conversion condition information R3, color information (color) in a case where a photon counting CT image is represented by a color map is associated with grayscale information in a case where the photon counting CT image is represented in grayscale.

[Configuration of Photon Counting CT Apparatus 3]

Unlike a conventional X-ray CT apparatus that uses an indirect converter configured by combining a phosphor such as a scintillator and a photodetector, the photon counting CT apparatus 3 discriminates an inspection target material through which X-rays have passed using a direct detector, generates a photon counting CT image in which the discriminated material can be distinguished, and stores the photon counting CT image. A photon counting CT image is associated with identification information or the like for identifying a subject.

[Configuration of Terminal Device 5]

The terminal device 5 is a device for referring to display information (photon counting CT image) provided by the medical information processing apparatus 1. The terminal device 5 is operated by an operator such as a doctor or a technician, for example. The terminal device 5 is, for example, a personal computer, a mobile terminal such as a tablet or a smartphone, or the like.

The terminal device 5 includes, for example, a communication interface 50, an input interface 60, a display 70, and processing circuitry 80. The communication interface 50 communicates with external devices such as the medical information processing apparatus 1 and the photon counting CT apparatus 3 via the communication network NW.

The input interface 60 receives various input operations from the operator of the terminal device 5, converts the received input operations into electrical signals, and outputs the electrical signals to the processing circuitry 80. For example, the input interface 60 includes a mouse, a keyboard, a trackball, a switch, a button, a joystick, a touch panel, and the like. The input interface 60 may be, for example, a user interface that accepts voice input such as a microphone.

Note that the input interface in this specification is not limited to those having physical operation parts such as a mouse and a keyboard. For example, examples of the input interface include electrical signal processing circuitry that receives an electrical signal corresponding to an input operation from external input equipment provided separately from the device and outputs the electrical signal to a control circuit.

The display 70 displays various types of information. For example, the display 70 displays an image generated by the processing circuitry 80, a graphical user interface (GUI) for receiving various input operations from the operator, and the like. For example, the display 70 is a liquid crystal display (LCD), a cathode ray tube (CRT) display, an organic electroluminescence (EL) display, or the like.

A display control function 81 of the processing circuitry 80 activates a dedicated application program, a browser, or the like, and causes the display 70 to display display information (photon counting CT images) provided by the medical information processing apparatus 1. Further, the display control function 81 generates a GUI for receiving various input operations from the operator and causes the display 70 to display the various input operations. For example, the display control function 81 generates a GUI for receiving an input operation requesting a photon counting CT image from the operator, causes the display 70 to display the GUI, and in a case where an input operation requesting acquisition of a photon counting CT image has been received, transmits the acquisition request to the medical information processing apparatus 1. Further, the display control function 81 causes the display 70 to display a photon counting CT image acquired from the medical information processing apparatus 1.

[Processing Flow]

Figure 5:
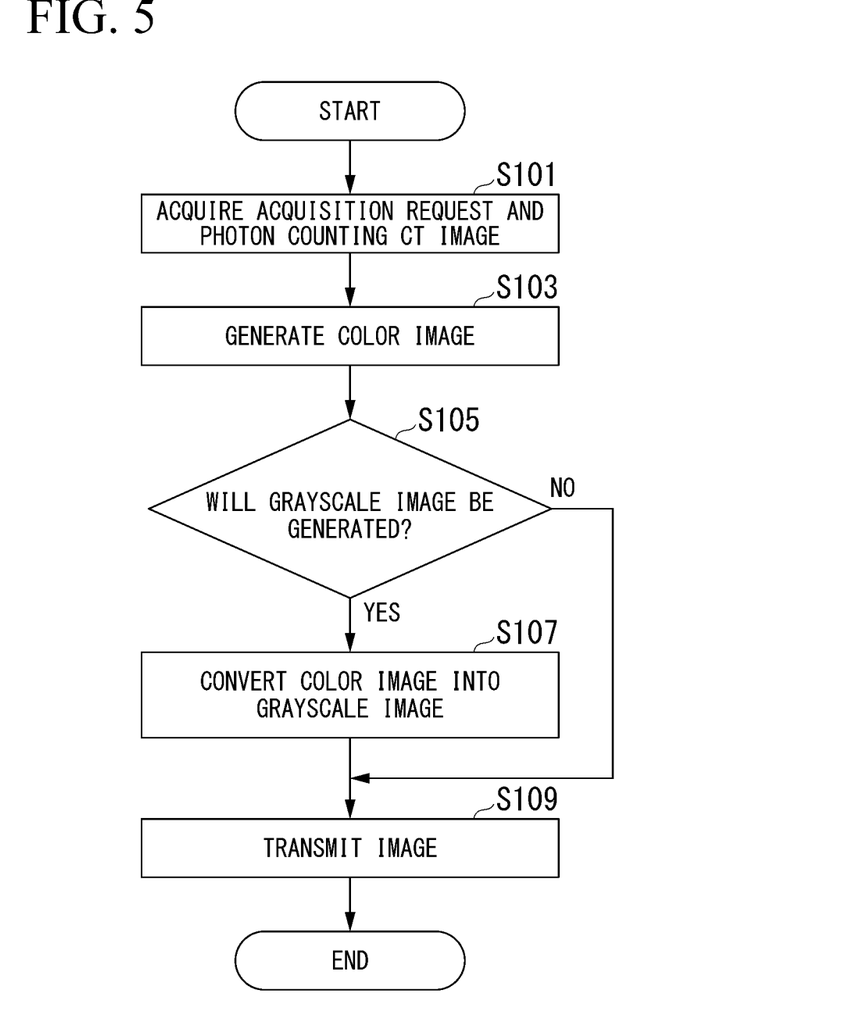
FIG. 5 is a flowchart showing an example of image processing of the medical information processing apparatus 1 according to the first embodiment.

Next, an example of image processing of the medical information processing apparatus 1 will be described. FIG. 5 is a flowchart showing an example of image processing of the medical information processing apparatus 1 according to the first embodiment. In this flowchart, an example of processing on the assumption that the terminal device 5 has a color display function will be described.

First, the acquisition function 11 of the processing circuitry 10 acquires an acquisition request for a photon counting CT image transmitted from the terminal device 5 on the basis of an operation of the operator via the network NW and acquires a photon counting CT image corresponding to the acquisition request from the photon counting CT apparatus 3 or a medical image database (not shown) (step S101). This acquisition request includes identification information for identifying a subject that is an acquisition target. The acquisition function 11 acquires the corresponding photon counting CT image on the basis of this identification information and stores the photon counting CT image in the memory 30.

Subsequently, the first image generation function 12 generates a color image on the basis of the photon counting CT image D1 and the color display condition information R1 (step S103). For example, the first image generation function 12 generates the color image by associating a pixel value of each pixel of the photon counting CT image D1 with color information with reference to the color display condition information R1.

That is, the first image generation function 12 generates the color image by associating the pixel value of each pixel of the acquired CT image with color information on the basis of the color display condition information R1 (first display condition information) in which color information is associated with pixel values of CT images.

Subsequently, the second image generation function 13 determines whether or not to generate a grayscale image on the basis of whether or not the acquisition request includes an instruction to generate a grayscale image (step S105).

Upon determining that a grayscale image will be generated (step S105; YES), the second image generation function 13 converts the color image generated by the first image generation function 12 into a grayscale image on the basis of the color/grayscale conversion condition information R3 (step S107). For example, the conversion function 14 converts the color image into the grayscale image by associating the color of each pixel of the color image with grayscale information with reference to the color/grayscale conversion condition information R3. Subsequently, the provision function 15 provides (transmits) the generated color image and/or the grayscale image generated by converting the color image to the terminal device 5 via the network NW (step S109).

That is, the second image generation function 13 generates the grayscale image by associating the pixel value of each pixel of the acquired CT image with grayscale information on the basis of the color/grayscale conversion condition information R3 (second display condition information) in which grayscale information is associated with pixel values of CT images.

On the other hand, upon determining that a grayscale image will not be generated (step S105; NO), the second image generation function 13 does not generate a grayscale image. The provision function 15 provides (transmits) the generated color image to the terminal device 5 via the network NW (step S109).

Figure 6A:
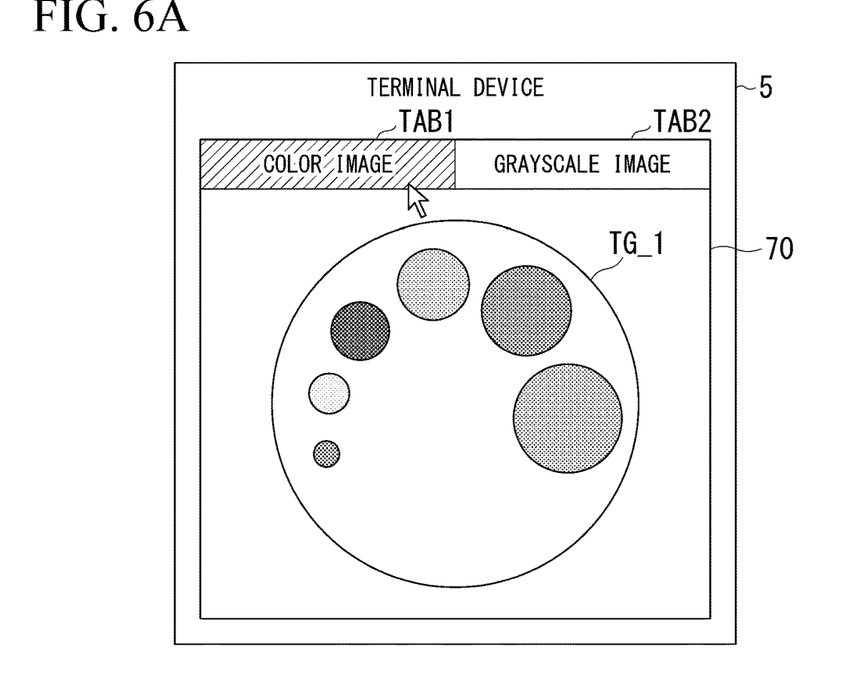
FIG. 6A is a diagram showing a display example of a photon counting CT image on a display 70 of a terminal device 5 according to the first embodiment.
Figure 6B:
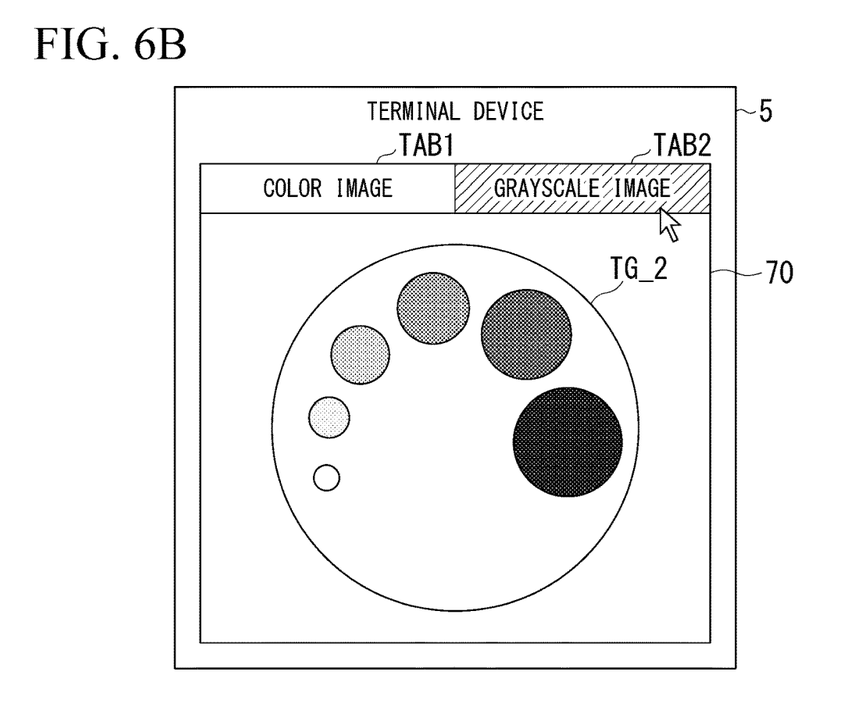
FIG. 6B is a diagram showing a display example of a photon counting CT image on the display 70 of the terminal device 5 according to the first embodiment.

FIG. 6A and FIG. 6B are diagrams showing display examples of photon counting CT images on the display 70 of the terminal device 5 according to the first embodiment. In the examples shown in FIG. 6A and FIG. 6B, display of each image can be switched by pressing either a tab TAB1 for selecting a color image or a tab TAB2 for selecting a grayscale image. In the example shown in FIG. 6A, the tab TAB1 is pressed and a color image TG_1 is displayed. In the example shown in FIG. 6B, the tab TAB2 is pressed and a grayscale image TG_2 is displayed. Circles with different display modes (colors) shown in FIG. 6A indicate regions having different ground substances such as calcium, calcification, bone, fat, muscle, air, organ, lesion, hard tissues, soft tissues, and a contrast substance. Similarly, circles with different display modes (grayscales) shown in FIG. 6B indicate regions having different ground substances. By enabling such display, the operator of the terminal device 5 can check both the color image TG_1 and the grayscale image TG_2.

That is, the provision function 15 provides display information capable of selectively displaying a color image and a grayscale image to the terminal device 5.

Figure 7:
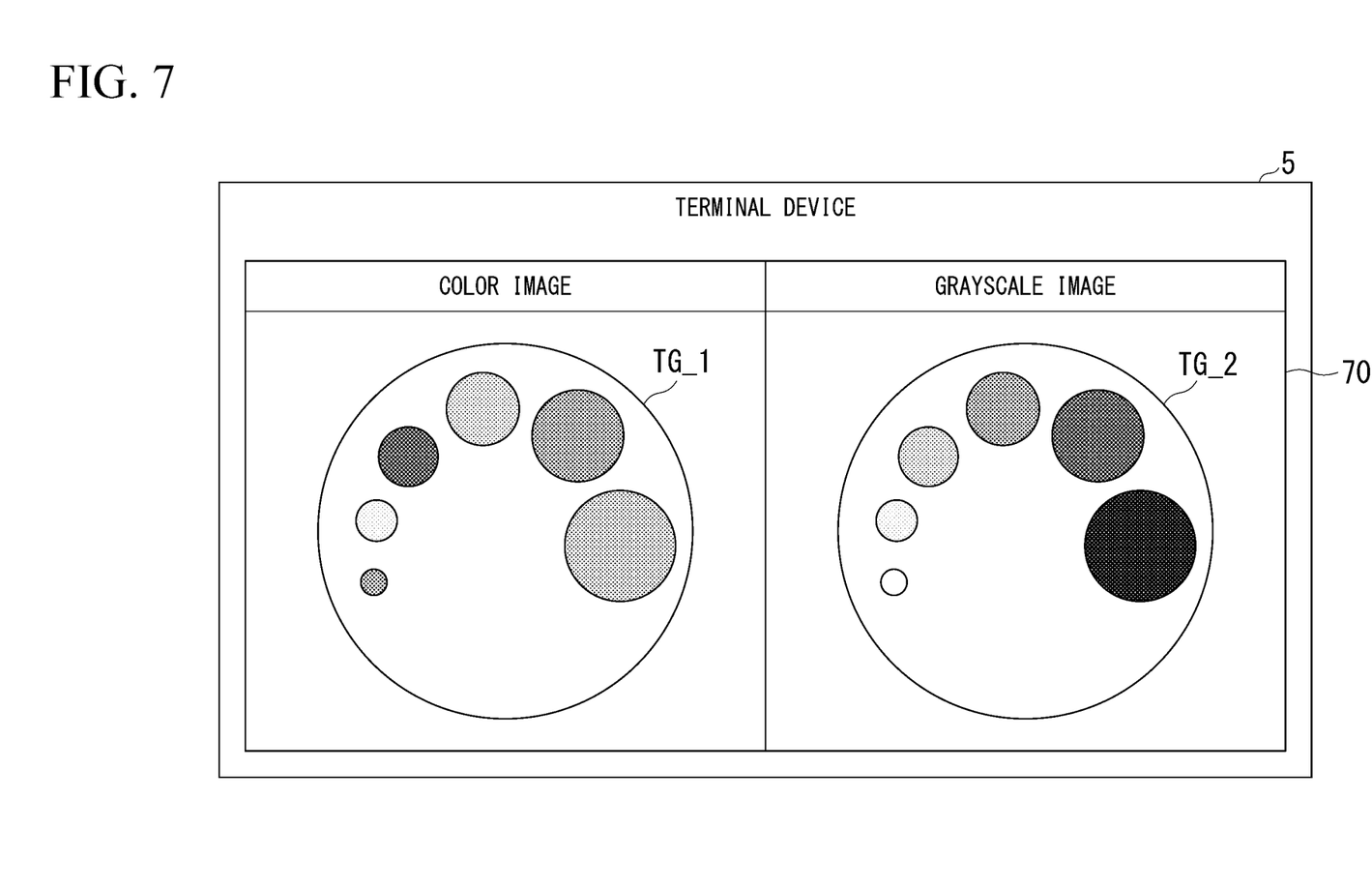
FIG. 7 is a diagram showing another display example of a photon counting CT image on the display 70 of the terminal device 5 according to the first embodiment.

FIG. 7 is a diagram showing another display example of a photon counting CT image on the display 70 of the terminal device 5 according to the first embodiment. In the example shown in FIG. 7, both the color image TG_1 and the grayscale image TG_2 are simultaneously displayed within the same screen. By enabling such display, the operator of the terminal device 5 can check both the color image TG_1 and the grayscale image TG_2 at the same time. With the above, processing of this flowchart ends.

That is, the provision function 15 provides display information capable of displaying both a color image and a grayscale image at the same time to the terminal device 5.

According to the first embodiment described above, it is possible to display CT images in both grayscale and a color map and thus it is possible to improve the convenience of checking CT images. For example, in a case where color display is not possible due to the limitation on display devices, in a case where a CT image is presented to a person who cannot perceive colors, in a case where a doctor wants to check a grayscale CT image during a medical examination, and the like, not only color images but also grayscale images can be displayed, and thus it is possible to flexibly display a CT image according to a request.

Second Embodiment

Next, a second embodiment will be described. Although a configuration in which a grayscale image is generated by converting a color image has been described in the first embodiment, a grayscale image is generated directly from the photon counting CT image D1 in the second embodiment. In the following description, components and functions common to those of the first embodiment are denoted by the same reference numerals, and descriptions thereof are omitted.

[Processing Flow]

Figure 8:
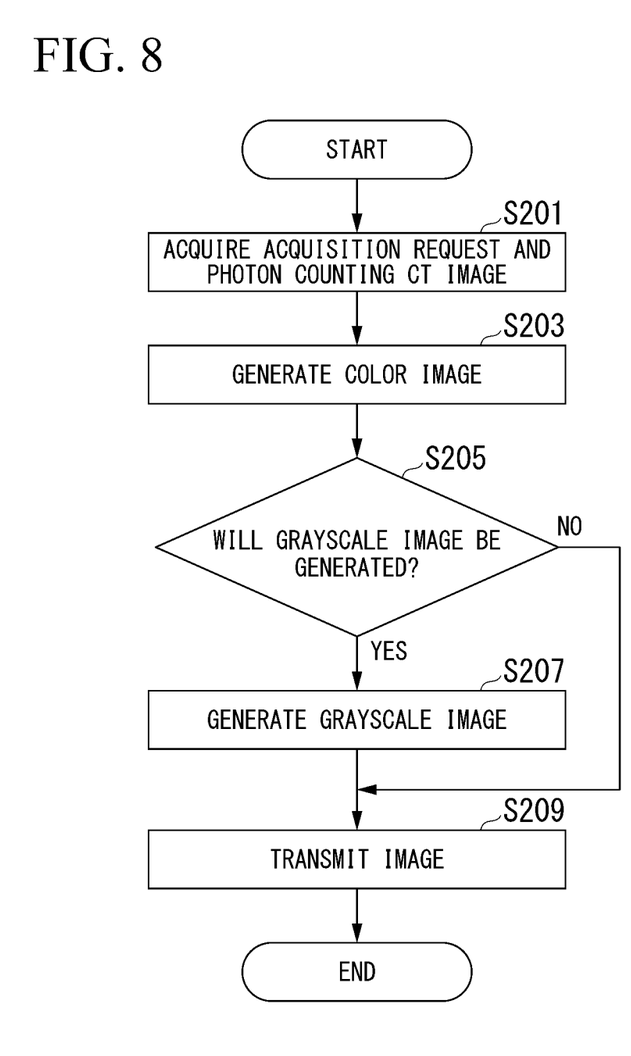
FIG. 8 is a flowchart showing an example of image processing of the medical information processing apparatus 1 according to a second embodiment.

An example of image processing of the medical information processing apparatus 1 will be described. FIG. 8 is a flowchart showing an example of image processing of the medical information processing apparatus 1 according to the second embodiment. In this flowchart, an example of processing on the assumption that the terminal device 5 has a color display function will be described.

First, the acquisition function 11 of the processing circuitry 10 acquires an acquisition request for a photon counting CT image transmitted from the terminal device 5 on the basis of an operation of the operator via the network NW and acquires a photon counting CT image corresponding to the acquisition request from the photon counting CT apparatus 3 or a medical image database (not shown) (step S201).

Subsequently, the first image generation function 12 generates a color image on the basis of the photon counting CT image D1 and the color display condition information R1 (step S203).

Subsequently, the second image generation function 13 determines whether or not to generate a grayscale image on the basis of whether or not an instruction to generate a grayscale image is included in the acquisition request (step S205).

Upon determining that a grayscale image will be generated (step S205; YES), the second image generation function 13 generates a grayscale image on the basis of the photon counting CT image D1 and the grayscale display condition information R2 (step S207). For example, the conversion function 14 generates the grayscale image by associating the pixel value of each pixel of the photon counting CT image D1 with grayscale information with reference to the grayscale display condition information R2. Subsequently, the provision function 15 provides (transmits) the generated color image and/or the grayscale image to the terminal device 5 via the network NW (step S209).

On the other hand, upon determining that a grayscale image will not be generated (step S205; NO), the second image generation function 13 does not generate a grayscale image. The provision function 15 provides (transmits) the generated color image to the terminal device 5 via the network NW (step S209).

Various images as shown in FIG. 6A, FIG. 6B, and FIG. 7 are displayed on the display 70 of the terminal device 5 that has received the color image and/or the grayscale image. With the above, processing of this flowchart ends.

According to the second embodiment described above, it is possible to display CT images in both grayscale and a color map, and thus it is possible to improve the convenience of checking CT images. For example, in a case where color display is not possible due to the limitation on display devices, in a case where a CT image is presented to a person who cannot perceive colors, in a case where a doctor wants to check a grayscale CT image during a medical examination, and the like, not only color images but also grayscale images can be displayed, and thus it is possible to flexibly display a CT image according to a request.

Figure 9:
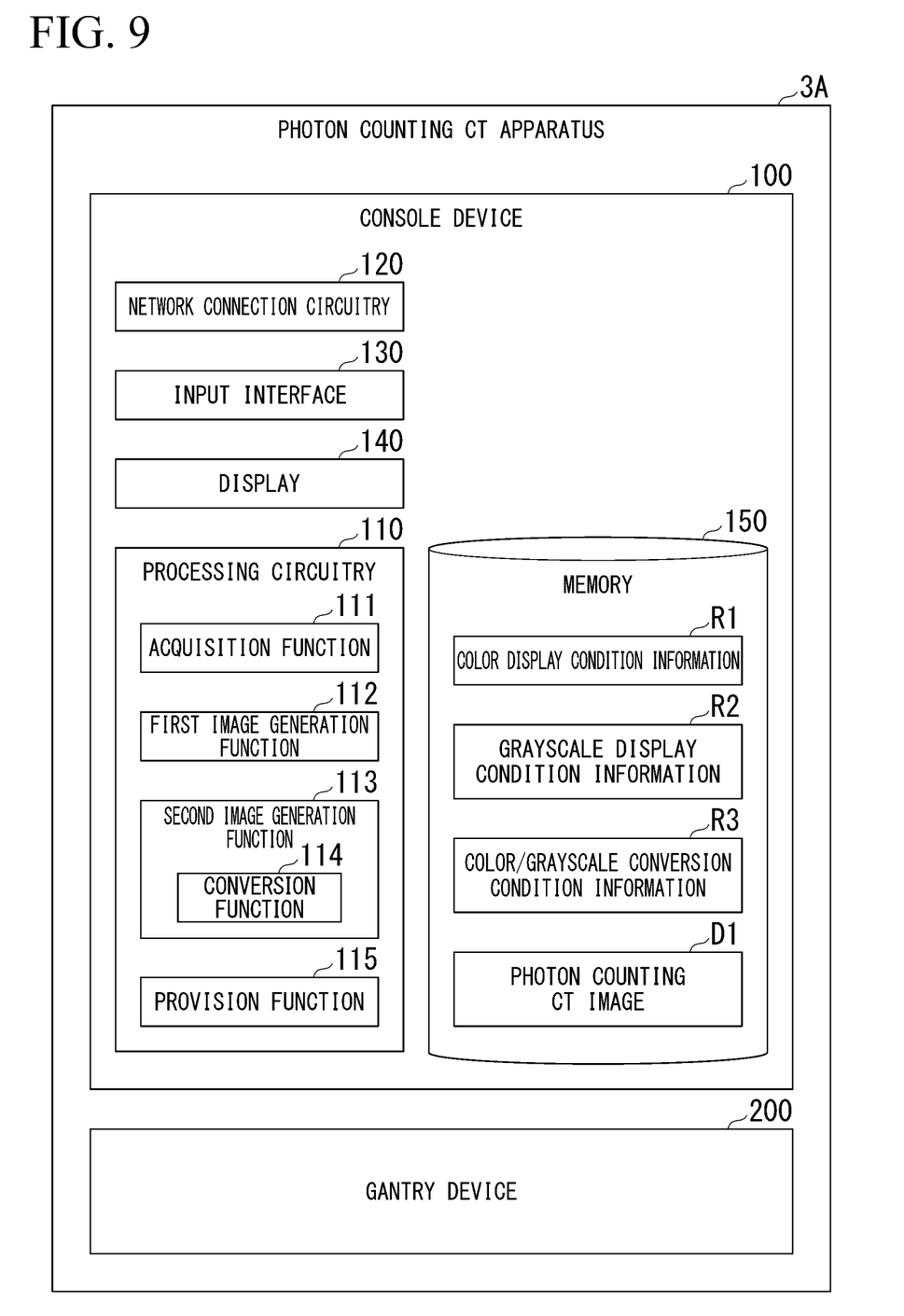
FIG. 9 is a diagram showing an example of functional blocks of a photon counting CT apparatus 3A having an image processing function according to a modified example.

Although an example of a case where the functions related to image processing are provided in the medical information processing apparatus 1 has been described in the above embodiment, some or all of such functions may be provided in the photon counting CT apparatus 3. FIG. 9 is a diagram showing an example of functional blocks of a photon counting CT apparatus 3A having an image processing function according to a modified example. The photon counting CT apparatus 3A includes, for example, a console device 100 and a gantry device 200. The console device 100 includes, for example, processing circuitry 110, a network connection circuitry 120, an input interface 130, a display 140, and a memory 150.

The processing circuitry 110 has functions equivalent to those of the processing circuitry 10 of the medical information processing apparatus 1 of FIG. 1. The processing circuitry 110 comprises, for example, an acquisition function 111, a first image generation function 112, a second image generation function 113, and a provision function 115. The second image generation function 113 includes, for example, a conversion function 114. The memory 150 stores information equivalent to that of the memory 30 of the medical information processing apparatus 1 of FIG. 1. The memory 150 stores, for example, the color display condition information R1, the grayscale display condition information R2, the color/grayscale conversion condition information R3, the photon counting CT image D1, and the like. The console device 100 causes the display 140 or the terminal device 5 to display generated various images. In this case, the photon counting CT apparatus 3 or a combination of the medical information processing apparatus 1 and the photon counting CT apparatus 3 is an example of a "medical information processing apparatus."

Note that some or all of the functions related to image processing may be provided in the terminal device 5. In this case, the terminal device 5 or a combination of the medical information processing apparatus 1 and the terminal device 5 is an example of a "medical information processing apparatus."

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical information processing apparatus, comprising:
    processing circuitry configured to:
        acquire a CT image obtained by a photon counting CT apparatus;
        generate a color image corresponding to the acquired CT image;
        generate a grayscale image corresponding to the color image based on the acquired CT image or the generated color image; and
        provide both the generated color image and the generated grayscale image to a terminal device,
    wherein the processing circuitry is further configured to cause the terminal device to selectively display the color image or the grayscale image, one of which is replaced with another within one and a same display area of a display of the terminal device.

2. The medical information processing apparatus according to claim 1, wherein the processing circuitry is further configured to convert the generated color image into a grayscale image based on conversion condition information in which color information of color images is associated with grayscale information to generate the grayscale image.

3. The medical information processing apparatus according to claim 1, wherein the processing circuitry is further configured to associate a pixel value of each pixel of the acquired CT image with color information based on first display condition information in which color information is associated with pixel values of CT images to generate the color image.

4. The medical information processing apparatus according to claim 1, wherein the processing circuitry is further configured to associate a pixel value of each pixel of the acquired CT image with grayscale information based on second display condition information in which grayscale information is associated with pixel values of CT images to generate the grayscale image.

5. A medical information processing method, using a computer of a medical information processing apparatus, the method comprising:
    acquiring a CT image obtained by a photon counting CT apparatus;
    generating a color image corresponding to the acquired CT image;
    generating a grayscale image corresponding to the color image based on the acquired CT image or the generated color image;
    providing both the generated color image and the generated grayscale image to a terminal device; and
    causing the terminal device to selectively display the color image or the grayscale image, one of which is replaced with another within one and a same display area of a display of the terminal device.

6. A photon counting CT apparatus, comprising:
    processing circuitry configured to:
        acquire a photon counting CT image;
        generate a color image corresponding to the acquired CT image;
        generate a grayscale image corresponding to the color image based on the acquired CT image or the generated color image;
        provide both the generated color image and the generated grayscale image to a terminal device; and
        cause the terminal device to selectively display the color image or the grayscale image, one of which is replaced with another within one and a same display area of a display of the terminal device.

* * * * *